(12) United States Patent
Kang et al.

(10) Patent No.: US 9,939,673 B2
(45) Date of Patent: Apr. 10, 2018

(54) CURVED DISPLAY DEVICE

(71) Applicant: Samsung Display Co., LTD., Yongin-si, Gyeonggi-Do (KR)

(72) Inventors: Hyun-ho Kang, Asan-si (KR); Osung Seo, Seoul (KR); Seungjun Yu, Cheonan-si (KR); Hawon Yu, Suwon-si (KR); Kikyung Youk, Bucheon-si (KR); Yeogeon Yoon, Suwon-si (KR); Sang-myoung Lee, Seoul (KR); Taekyung Yim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 79 days.

(21) Appl. No.: 15/013,479

(22) Filed: Feb. 2, 2016

(65) Prior Publication Data
US 2016/0274409 A1    Sep. 22, 2016

(30) Foreign Application Priority Data
Mar. 18, 2015    (KR) ........................ 10-2015-0037675

(51) Int. Cl.
*G02F 1/1335*    (2006.01)
*G02F 1/1362*    (2006.01)
*G02F 1/1337*    (2006.01)
*G02F 1/1343*    (2006.01)

(52) U.S. Cl.
CPC .. *G02F 1/133512* (2013.01); *G02F 1/133707* (2013.01); *G02F 2001/133757* (2013.01); *G02F 2001/134345* (2013.01); *G02F 2001/136218* (2013.01)

(58) Field of Classification Search
CPC ... G02F 1/133512; G02F 2001/136218; G02F 1/133707; G02F 2001/133757; G02F 2001/134345
See application file for complete search history.

(56) References Cited

U.S. PATENT DOCUMENTS

2009/0244462 A1* 10/2009 Tsubata ................. G02F 1/1309
349/129
2014/0063843 A1    3/2014 Yeo et al.

FOREIGN PATENT DOCUMENTS

KR    1020070091080 A    9/2007
KR    1020080000917 A    1/2008

* cited by examiner

*Primary Examiner* — Charles Chang
(74) *Attorney, Agent, or Firm* — Cantor Colburn LLP

(57) ABSTRACT

A curved display device includes a first substrate curved along a first direction and comprising pixel areas defined therein, a second substrate coupled to the first substrate and curved together with the first substrate, a liquid crystal layer interposed between the first substrate and the second substrate and comprising liquid crystal molecules, and a light blocking member disposed on the first substrate or the second substrate to block a light, where domains are defined in each of the pixel areas and arranged in a second direction crossing the first direction, the domains are arranged in a matrix form in the pixel areas, and the light blocking member includes a first light blocking layer having a first width and a second light blocking layer having a second width greater than the first width.

23 Claims, 14 Drawing Sheets

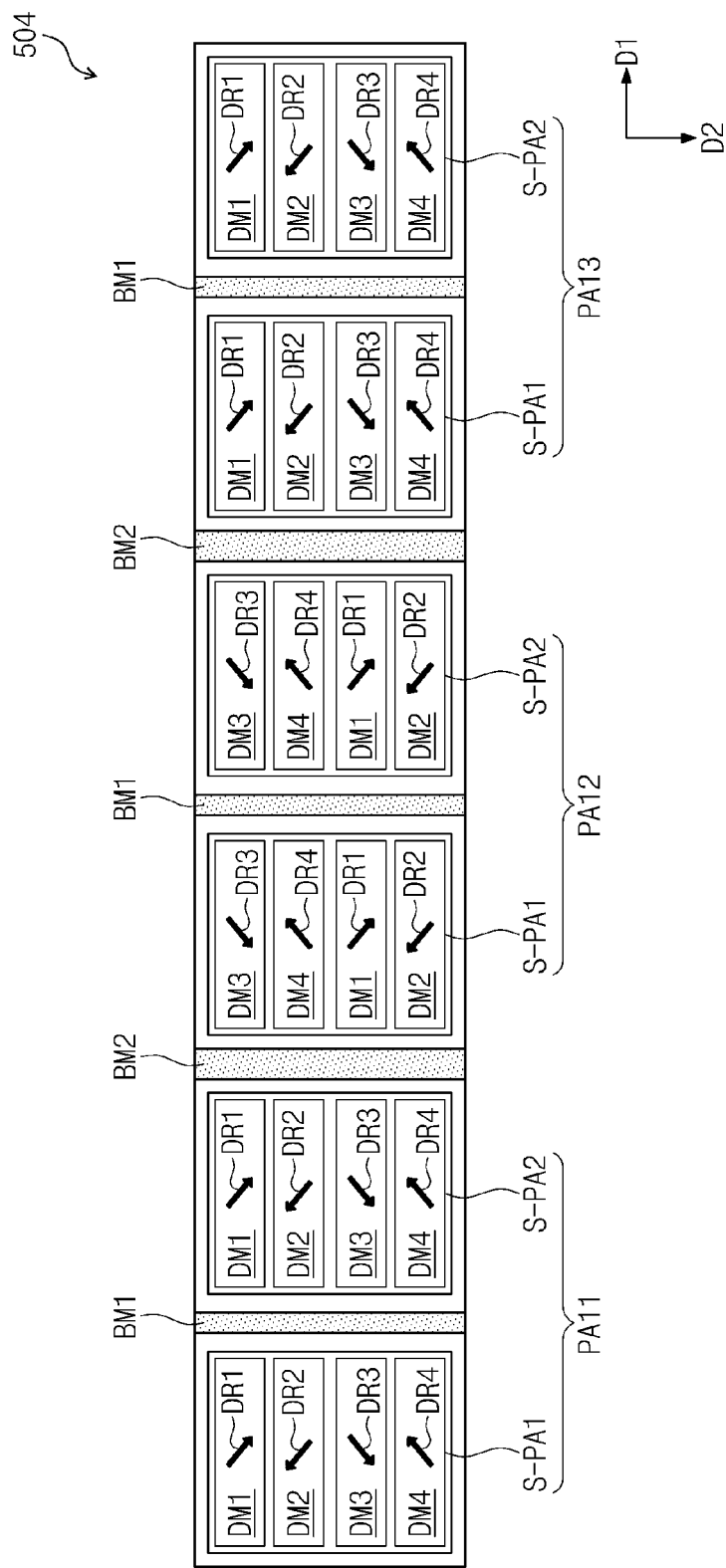

CURVED DISPLAY DEVICE

This application claims priority to Korean Patent Application No. 10-2015-0037675, filed on Mar. 18, 2015, and all the benefits accruing therefrom under 35 U.S.C. § 119, the content of which in its entirety is herein incorporated by reference.

BACKGROUND

1. Field

The invention relates to a curved display device. More particularly, the invention relates to a curved display device having a curved display area.

2. Description of the Related Art

A flat panel display device is widely applied to various information-processing devices, such as a television set, a monitor, a notebook computer, a mobile phone, etc., to display an image. In recent years, a curved display device having a curved display area has been developed. The curved display device provides the image having an improved three-dimensional effect, a sense of immersion (or immersiveness) and presence to a viewer.

SUMMARY

The invention provides a curved display device having an improved display quality.

Exemplary embodiments of the invention provide a curved display device including a first substrate, a second substrate, a liquid crystal layer, and a light blocking member.

In an exemplary embodiment, the first substrate is curved along a first direction and includes a plurality of pixel areas defined therein. The second substrate is coupled to the first substrate and curved together with the first substrate. The liquid crystal layer is interposed between the first substrate and the second substrate and includes liquid crystal molecules. The light blocking member is disposed on the first substrate or the second substrate to block a light.

In an exemplary embodiment, domains are defined in each of the plurality of pixel areas and arranged in a second direction crossing the first direction, and the domains are arranged in a matrix form in the pixel areas. The light blocking member includes a first light blocking layer having a first width and a second light blocking layer having a second width greater than the first width. The first light blocking layer is disposed between two domains sequentially arranged in a row direction of the matrix and aligning the liquid crystal molecules in a same direction, and the second light blocking layer is disposed between two domains sequentially arranged in the row direction of the matrix and aligning the liquid crystal molecules in different directions from each other.

Exemplary embodiments of the invention provide a curved display device including a first substrate, a second substrate, a liquid crystal layer, and a light blocking member.

In an exemplary embodiment, the first substrate is curved along a first direction and includes a plurality of pixel areas defined therein. The second substrate is coupled to the first substrate and curved together with the first substrate. The liquid crystal layer is interposed between the first substrate and the second substrate and includes liquid crystal molecules. The light blocking member is disposed on the first substrate or the second substrate to block a light, and the light blocking member is disposed between two adjacent pixel areas of the plurality of pixel areas arranged in the first direction of the pixel areas.

In an exemplary embodiment, each of the plurality of pixel areas includes a unit domain group defined therein, the unit domain group includes a plurality of domains arranged in a second direction crossing the first direction, and the plurality of domains are arranged in a matrix form in the pixel areas.

In an exemplary embodiment, the light blocking member includes a first light blocking layer having a first width and a second light blocking layer having a second width greater than the first width. The first light blocking layer extends between two same unit domain groups of the unit domain groups and the second light blocking layer extends between two different unit domain groups of the unit domain groups.

According to the above, the first light blocking layer having the first width and the second light blocking layer having the second width greater than the first width are selectively arranged in the matrix including the plurality of domains in accordance with the arrangement order of the plurality of domains. Therefore, the alignment area, in which alignment defects occur due to the misalignment of the display panel of the curved display device, is easily covered by the second light blocking layer. In addition, since the first light blocking layer is applied to the curved display device, the aperture ratio of the matrix is improved.

BRIEF DESCRIPTION OF THE DRAWINGS

The above and other exemplary embodiment, advantages and features of the disclosure will become readily apparent by reference to the following detailed description when considered in conjunction with the accompanying drawings, in which:

FIG. 9 is a diagram showing another exemplary embodiment of a plurality of domains, a first light blocking layer, and a second light blocking layer defined in a plurality of pixel areas of a display panel according to the invention.

DETAILED DESCRIPTION

Figure 1A:
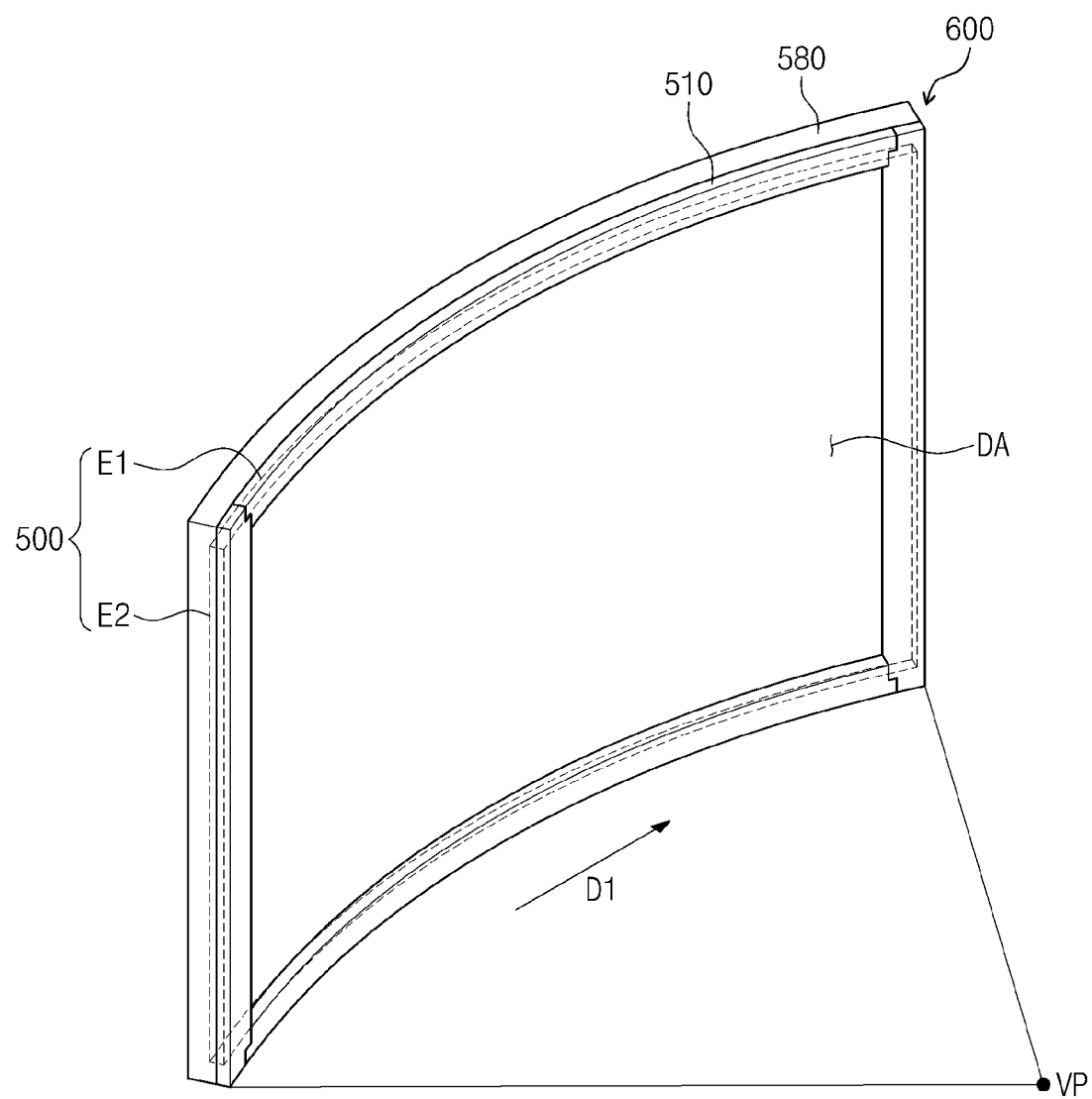
FIG. 1A is a perspective view showing an exemplary embodiment of a curved display device according to the invention.

The following description with reference to the accompanying drawings is provided to assist in a comprehensive understanding of various embodiments of the invention as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of various embodiments of the invention is provided for illustration purpose only and not for the purpose of limiting the invention as defined by the appended claims and their equivalents.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 1B:
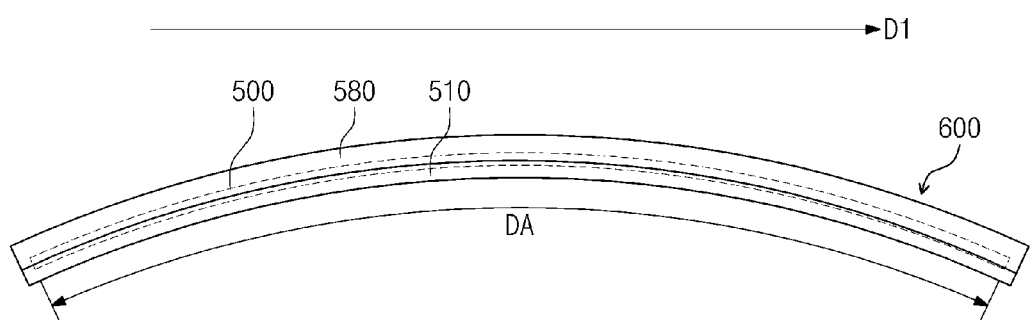
FIG. 1B is a top view showing the curved display device shown in FIG. 1A.

FIG. 1A is a perspective view showing a curved display device 600 according to an exemplary embodiment of the invention, and FIG. 1B is a top view showing the curved display device shown in FIG. 1A.

Referring to FIGS. 1A and 1B, the curved display device 600 is curved along a first direction D1 and provided with a display area DA having a curved shape along the first direction D1.

In the illustrated exemplary embodiment, a viewpoint VP of the viewer is defined in front of the curved display device 600, and the display area DA has a concave-curved shape when viewed at the viewpoint VP.

The curved display device 600 includes a display panel 500, and the display panel 500 is curved along the first direction D1. The display panel 500 includes long sides E1 and short sides E2. In the illustrated exemplary embodiment, the long sides E1 of the display panel 500 extend in a curved line shape along the first direction D1 and the short sides E2 of the display panel 500 extend in a straight line shape.

The curved display device 600 includes elements that are coupled to the display panel 500. The curved display device 600 includes an accommodating member 580 and a covering member 510. The accommodating member 580 accommodates the display panel 500 therein, and the covering member 510 covers edges of the display panel 500. In addition, the accommodating member 580 and the covering member 510 support the display panel 500 to allow the display panel 500 to be curved in the first direction D1 and maintain the curved shape of the display panel 500.

Each of the accommodating member 580 and the covering member 510 has a curved shape to correspond to the curved shape of the display panel 500. In an exemplary embodiment, a bottom portion of the accommodating member 580 facing a rear surface of the display panel 500 has a curved shape along the first direction D1, and a portion of the covering member 510 covering the long sides E1 of the display panel 500 has a curved shape along the first direction D1.

In the illustrated exemplary embodiment, the display panel 500 may be, but not limited to, a liquid crystal display panel, for example. In this case, the curved display device 600 may further include a backlight assembly (not shown) providing a light to the display panel 500. The backlight assembly may have a shape corresponding to the curved shape of the display panel 500. In an exemplary embodiment, when the backlight assembly includes a light guiding plate, the light guiding plate may have a curved shape along the first direction D1.

Figure 2A:
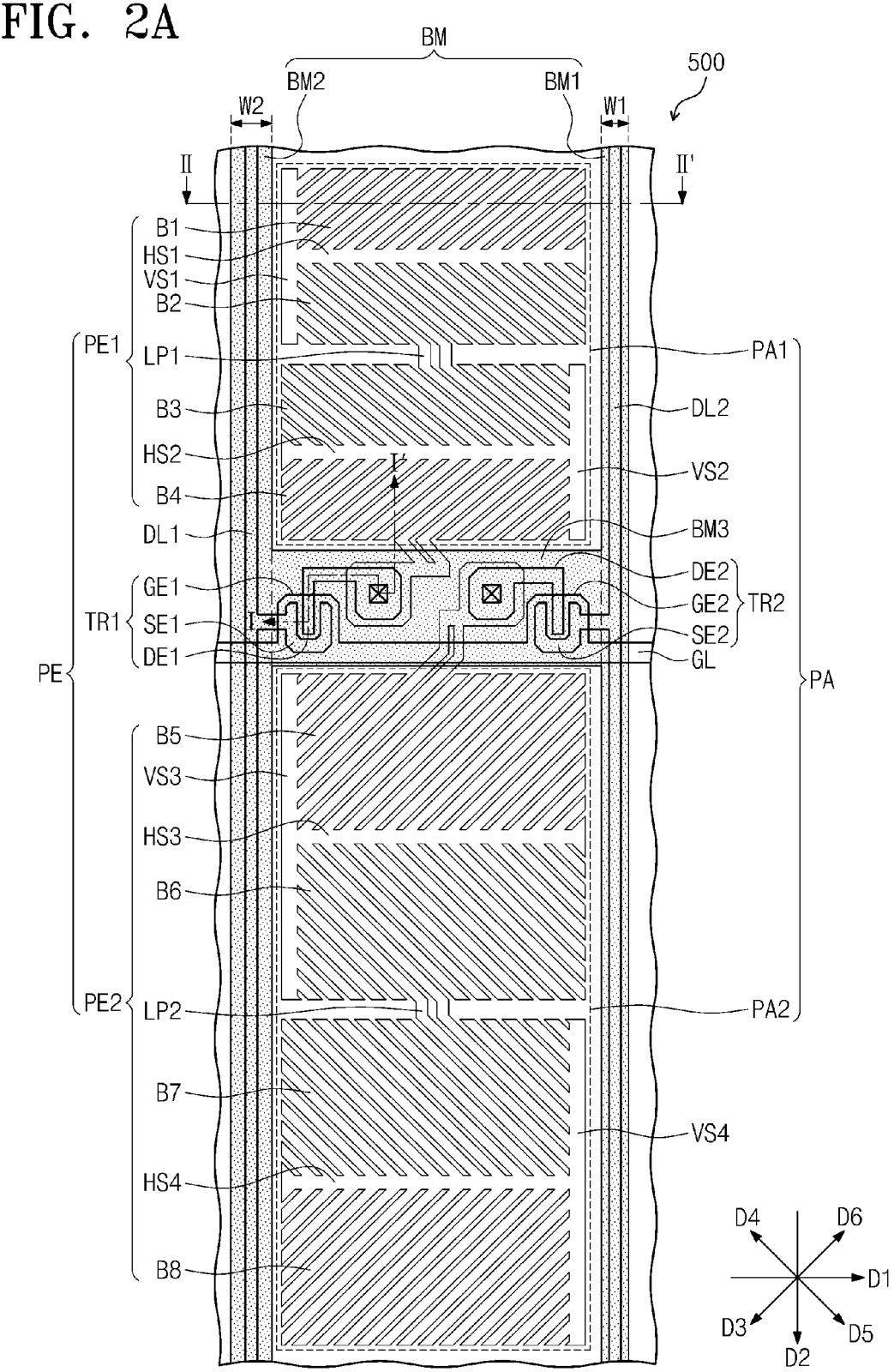
FIG. 2A is a plan view showing a pixel of a display panel shown in FIG. 1A.
Figure 2B:
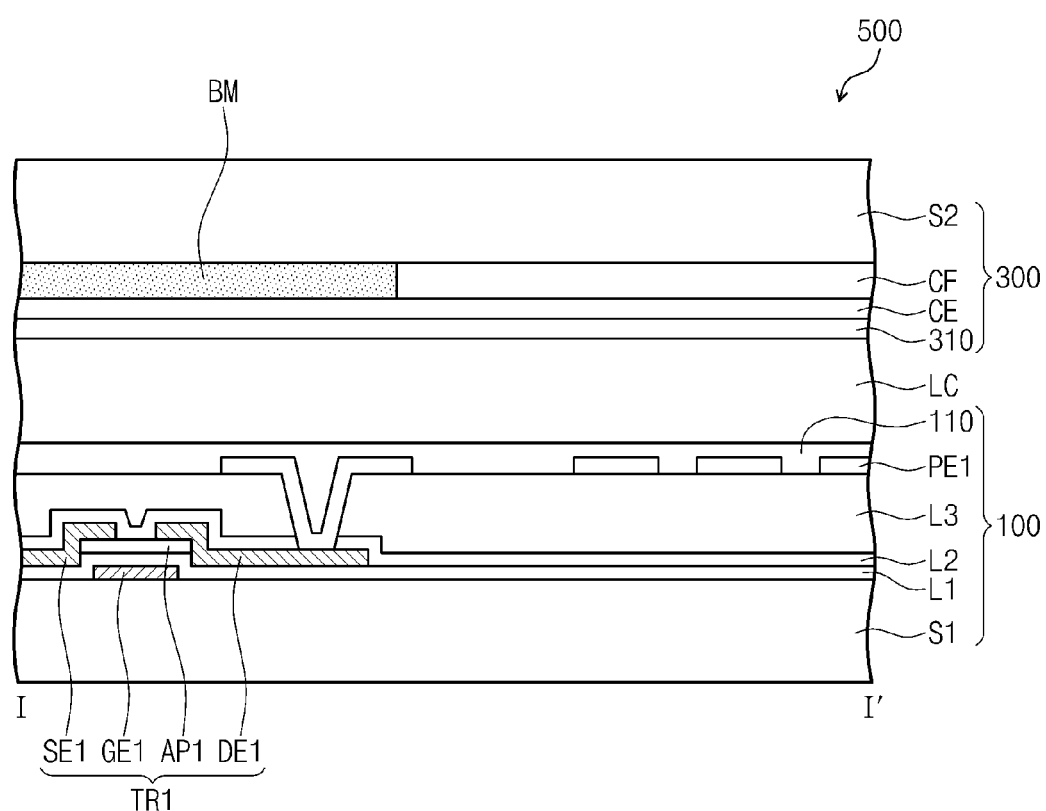
FIG. 2B is a cross-sectional view taken along line I-I' of FIG. 2A.
Figure 2C:
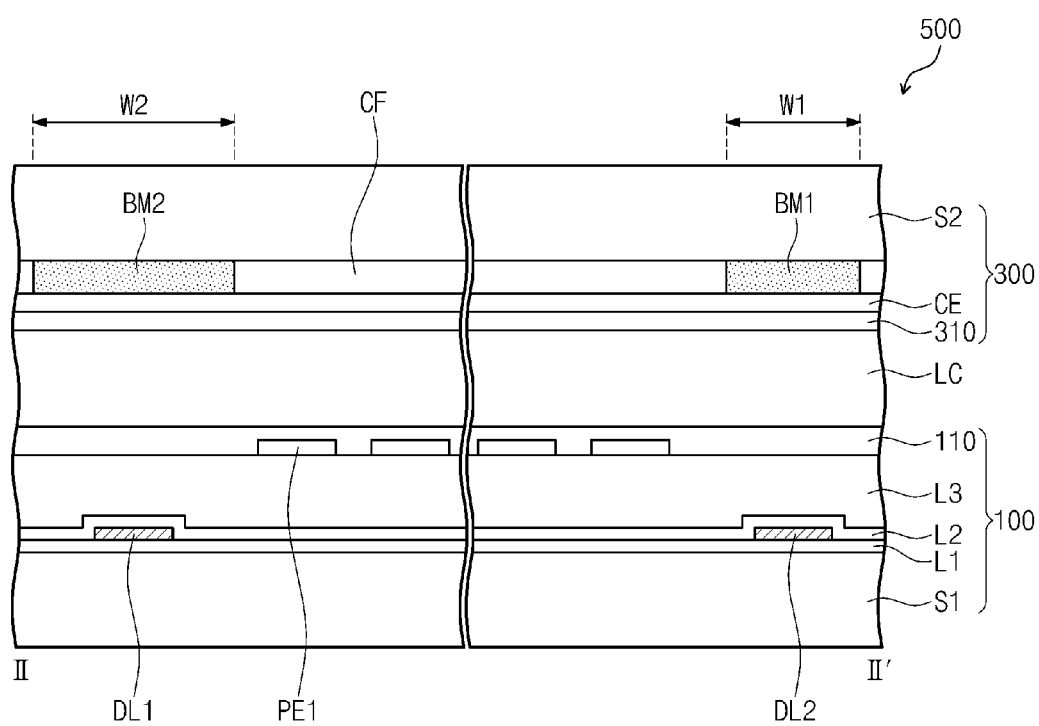
FIG. 2C is a cross-sectional view taken along line II-II' of FIG. 2A.

FIG. 2A is a plan view showing a pixel of the display panel 500 shown in FIG. 1A, FIG. 2B is a cross-sectional view taken along line I-I' of FIG. 2A, and FIG. 2C is a cross-sectional view taken along line II-II' of FIG. 2A.

The display panel 500 includes a plurality of pixels, but the pixels have substantially the same structure and function. Thus, FIG. 2A shows only one pixel disposed in one pixel area PA of the pixels as a representative example, and detailed descriptions on the other pixels will be omitted in order to avoid redundancy.

Referring to FIGS. 2A, 2B, and 2C, the display panel 500 includes a first substrate 100, a second substrate 300, and a liquid crystal layer LC interposed between the first substrate 100 and the second substrate 300.

The first substrate 100 includes a first base substrate S1, a gate line GL, a first data line DL1, a second data line DL2, a first thin film transistor ("TFT") TR1, a second TFT TR2, a pixel electrode PE, and a first alignment layer 110.

The first base substrate S1 may be an insulating substrate having a light transmitting property. In the illustrated exemplary embodiment, the first base substrate S1 may be a glass substrate or a plastic substrate, for example.

The gate line GL is disposed on the first base substrate S1, and the gate line GL is electrically connected to the first and second TFTs TR1 and TR2 to apply a gate signal to the first and second TFTs TR1 and TR2.

The pixel area PA is divided into a first sub-pixel area PA1 and a second sub-pixel area PA2. In this case, the pixel electrode PE includes a first sub-pixel electrode PE1 disposed in the first sub-pixel area PA1 and a second sub-pixel electrode PE2 disposed in the second sub-pixel area PA2.

The first and second data lines DL1 and DL2 are insulated from the gate line GL and disposed on the first base substrate S1. The first data line DL1 applies a first data signal and the second data line DL2 applies a second data signal.

The first data line DL1 extends along one side of the first and second sub-pixel electrodes PE1 and PE2, the second data line DL2 extends along the other side of the first and second sub-pixel electrodes PE1 and PE2, and thus the first and second sub-pixel electrodes PE1 and PE2 are disposed between the first data line DL1 and the second data line DL2.

The first TFT TR1 is electrically connected to the gate line GL, the first data line DL1, and the first sub-pixel electrode PE1. The first TFT TR1 includes a first gate electrode GE1, a first active pattern AP1, a first source electrode SE1, and a first drain electrode DE1. The first gate electrode GE1 is branched from the gate line GL, the first active pattern AP1 is disposed on the first gate electrode GE1, and a first insulating layer L1 is interposed between the first gate electrode GE1 and the first active pattern AP1. The first source electrode SE1 is branched from the first data line DL1 and contacts the first active pattern AP1, and the first drain electrode DE1 is spaced apart from the first source electrode SE1 and contacts the first active pattern AP1.

A second insulating layer L2 covers the first TFT TR1, and a third insulating layer L3 is disposed on the second insulating layer L2. The first sub-pixel electrode PE1 is disposed on the third insulating layer L3, and the first sub-pixel electrode PE1 contacts the first drain electrode DE1 through a contact hole defined through the second and third insulating layers L2 and L3.

The second TFT TR2 is electrically connected to the gate line GL, the second data line DL2, and the second sub-pixel electrode PE2. The second TFT TR2 includes a second gate electrode GE2, a second active pattern (not shown), a second source electrode SE2, and a second drain electrode DE2. The second gate electrode GE2 is branched from the gate line GL, the second active pattern is disposed on the second gate electrode GE2, and the first insulating layer L1 is interposed between the second gate electrode GE2 and the second active pattern. The second source electrode SE2 is branched from the second data line DL2 and contacts the second active pattern, and the second drain electrode DE2 is spaced apart from the second source electrode SE2 and contacts the second active pattern.

The second sub-pixel electrode PE2 is disposed on the third insulating layer L3, and the second sub-pixel electrode PE2 contacts the second drain electrode DE2 through a contact hole defined through the second and third insulating layers L2 and L3.

In an exemplary embodiment, each of the first active pattern AP1 and the second active pattern may include a semiconductor material, such as amorphous silicon, crystalline silicon, etc., but it should not be limited thereto or thereby. According to another exemplary embodiment, the first active pattern AP1 and the second active pattern may include an oxide semiconductor, e.g., indium gallium zinc oxide ("IGZO"), $ZnO$, $SnO_2$, $In_2O_3$, $Zn_2SnO_4$, $Ge_2O_3$, $HfO_2$, etc., or a compound semiconductor, e.g., GaAs, GaP, InP, etc.

When the first and second TFTs TR1 and TR2 are turned on in response to the gate signal, the first data signal is applied to the first sub-pixel electrode PE1 through the turned-on first TFT TR1 and the second data signal different from the first data signal is applied to the second sub-pixel electrode PE2 through the turned-on second TFT TR2. As described above, since the first and second sub-pixel electrodes PE1 and PE2 are respectively driven by the first and second data signals different from each other, a grayscale level of the image displayed in the first sub-pixel area PA1 is different from a grayscale level of the image displayed in the second sub-pixel area PA2.

The first alignment layer 110 is disposed on the first base substrate S1 and contacts the liquid crystal layer LC. When no electric field is generated between the first and second substrates 100 and 300, a portion of liquid crystal molecules, which contacts the first alignment layer 110 among the liquid crystal molecules of the liquid crystal layer LC, is pre-tilted by the first alignment layer 110.

The first sub-pixel electrode PE1 includes a first horizontal trunk portion HS1, a second horizontal trunk portion HS2, a first vertical trunk portion VS1, a second vertical trunk portion VS2, first, second, third, and fourth branch portions B1, B2, B3, and B4, and a first domain connection portion LP1. In addition, the second sub-pixel electrode PE2 includes a third horizontal trunk portion HS3, a fourth horizontal trunk portion HS4, a third vertical trunk portion VS3, a fourth vertical trunk portion VS4, fifth, sixth, seventh, and eighth branch portions B5, B6, B7, and B8, and a second domain connection portion LP2.

In the illustrated exemplary embodiment, the first sub-pixel electrode PE1 has a size smaller than that of the second sub-pixel electrode PE2 but the first and second sub-pixel electrodes PE1 and PE2 have a similar structure with each other. Thus, the first sub-pixel electrode PE1 will be described in detail as a representative example, and details of the second sub-pixel electrode PE2 will be omitted.

The first vertical trunk portion VS1 is connected to the first horizontal trunk portion HS1, edges of the first branch portions B1, and edges of the second branch portions B2, and the second vertical trunk portion VS2 is connected to the second horizontal trunk portion HS2, edges of the third branch portions B3, and edges of the fourth branch portions B4. In the illustrated exemplary embodiment, each of the first and second vertical trunk portions VS1 and VS2 extends in a second direction D2.

The first horizontal trunk portion HS1 is connected to the first vertical trunk portion VS1, the edges of the first branch portions B1, and the edges of the second branch portions B2. In the illustrated exemplary embodiment, the first horizontal trunk portion HS1 extends in the first direction D1 to be branched from a center portion of the first vertical trunk portion VS1. The first branch portions B1 and the second branch portions B2 are symmetrically disposed with respect to the first horizontal trunk portion HS1.

The second horizontal trunk portion HS2 is connected to the second vertical trunk portion VS2, the edges of the third branch portions B3, and the edges of the fourth branch portions B4. In the illustrated exemplary embodiment, the second horizontal trunk portion HS2 extends in the first direction D1 to be branched from a center portion of the second vertical trunk portion VS2. The third branch portions B3 and the fourth branch portions B4 are symmetrically disposed with respect to the second horizontal trunk portion HS2.

A portion of the first branch portions B1 is branched from the first horizontal trunk portion HS1 and the other portion of the first branch portions B1 is branched from the first vertical trunk portion VS1. In addition, each of the first branch portions B1 extends in a third direction D3, which is inclined with respect to the first and second directions D1 and D2 when viewed in a plan view, and the first branch portions B1 are spaced apart from each other.

A portion of the second branch portions B2 is branched from the first horizontal trunk portion HS1 and the other portion of the second branch portions B2 is branched from the first vertical trunk portion VS1. In addition, each of the second branch portions B2 extends in a fourth direction D4, which is inclined with respect to the first and second directions D1 and D2 when viewed in a plan view, and the second branch portions B2 are spaced apart from each other.

In the illustrated exemplary embodiment, the fourth direction D4 crosses the third direction D3 when viewed in a plan view. In an exemplary embodiment, the third direction D3 may be substantially perpendicular to the fourth direction D4 when viewed in a plan view, and each of the third and fourth directions D3 and D4 may define an angle of about 45 degrees with respect to a reverse direction of the first direction D1, for example.

A portion of the third branch portions B3 is branched from the second horizontal trunk portion HS2 and the other portion of the third branch portions B3 is branched from the second vertical trunk portion VS2. In addition, each of the third branch portions B3 extends in a fifth direction D5, which is inclined with respect to the first and second directions D1 and D2 when viewed in a plan view, and the third branch portions B3 are spaced apart from each other.

A portion of the fourth branch portions B4 is branched from the second horizontal trunk portion HS2 and the other portion of the fourth branch portions B4 is branched from the second vertical trunk portion VS2. In addition, each of the fourth branch portions B4 extends in a sixth direction D6, which is inclined with respect to the first and second directions D1 and D2 when viewed in a plan view, and the fourth branch portions B4 are spaced apart from each other.

In the illustrated exemplary embodiment, the sixth direction D6 crosses the fifth direction D5 when viewed in a plan view. In an exemplary embodiment, the fifth direction D5 may be substantially perpendicular to the sixth direction D6 when viewed in a plan view, and each of the fifth and sixth directions D5 and D6 may form an angle of about 45 degrees with respect to the first direction D1, for example.

The first domain connection portion LP1 is disposed between a second domain DM2 (refer to FIG. 3A) and a third domain DM3 (refer to FIG. 3A) of the first sub-pixel area PA1, and the first domain connection portion LP1 connects the second branch portions B2 and the third branch portions B3.

When the first to eighth branch portions B1 to B8 have the above described structure, first, second, third, and fourth domains DM1, DM2, DM3, and DM4 (refer to FIG. 3A) are defined in each of the first and second sub-pixel areas PA1 and PA2. Details on the first to fourth domains DM1 to DM4 will be described with reference to FIG. 3A.

The second substrate 300 includes a second base substrate S2, a common electrode CE, a color filter CF, a light blocking member BM, and a second alignment layer 310.

In an exemplary embodiment, the second base substrate S2 may be an insulating substrate having a light transmitting property. In the illustrated exemplary embodiment, the second base substrate S2 may be a glass substrate or a plastic substrate, for example.

The common electrode CE is disposed on the second base substrate S2 and generates an electric field applied to the liquid crystal layer LC in cooperation with the pixel electrode PE. The color filter CF is disposed on the second base substrate S2 to filter a light passing through the liquid crystal layer LC to a colored light.

The light blocking member BM is disposed on the second base substrate S2 to block the light passing through the liquid crystal layer LC and includes a material blocking the light. In an exemplary embodiment, the light blocking member BM may include an organic composition with a color, e.g., black, or a metal material reflecting the light, e.g., chromium.

In the illustrated exemplary embodiment, the color filter CF and the light blocking member BM are disposed on the second base substrate S2. However, according to another exemplary embodiment, the color filter CF and the light blocking member BM may be disposed on the first base substrate S1.

The light blocking member BM includes a first light blocking layer BM1, a second light blocking layer BM2, and a third light blocking layer BM3.

Each of the first and second light blocking layers BM1 and BM2 extends in the second direction D2 along an area between the pixel area PA and another pixel area (not shown) disposed adjacent to the pixel area PA. According to the exemplary embodiment shown in FIG. 2A, the first light blocking layer BM1 overlaps the second data line DL2, and the second light blocking layer BM2 overlaps the first data line DL1.

The first and second light blocking layers BM1 and BM2 may have different widths from each other. In the illustrated exemplary embodiment, the first light blocking layer BM1 has a first width W1 and the second light blocking layer BM2 has a second width W2 that is greater than the first width W1.

According to the exemplary embodiment shown in FIG. 2A, the first light blocking layer BM1 is disposed at one side of the pixel area PA and the second light blocking layer BM2 is disposed at the other side of the pixel area PA. However, the structure of the first and second light blocking layers BM1 and BM2 should not be limited thereto or thereby, and the structure of the first and second light blocking layers BM1 and BM2 disposed at the one side and the other side of the pixel area PA may be changed depending on the structure of the domains defined in the pixel area PA. Details on the above will be described with reference to FIG. 4.

The third light blocking layer BM3 extends in the first direction D1 along an area between the first sub-pixel area PA1 and the second sub-pixel area PA2. In the illustrated exemplary embodiment, the third light blocking layer BM3 is unitary with the first and second light blocking layers BM1 and BM2 to be connected to the first and second light blocking layers BM1 and BM2, and the third light blocking layer BM3 overlaps the first and second TFTs TR1 and TR2.

The second alignment layer 310 is disposed on the second base substrate S2 and contacts the liquid crystal layer LC. When no electric field is generated between the first substrate 100 and the second substrate 300, a portion of the liquid crystal molecules, which contacts the second alignment layer 310 among the liquid crystal molecules included in the liquid crystal layer LC, is pre-tilted by the second alignment layer 310.

Figure 3A:
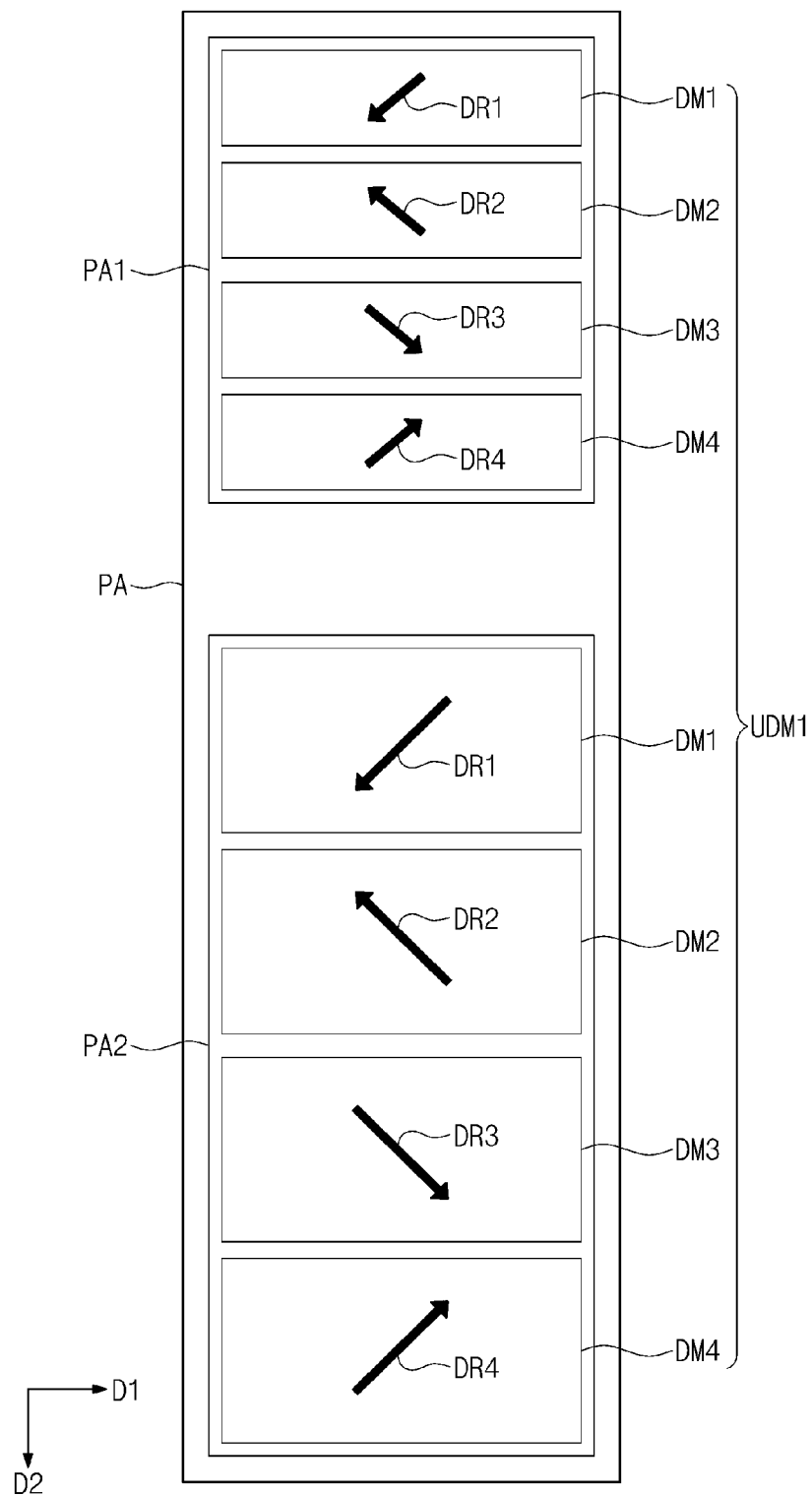
FIG. 3A is a view showing a first unit domain group defined in a pixel area shown in FIG. 2A.
Figure 3B:
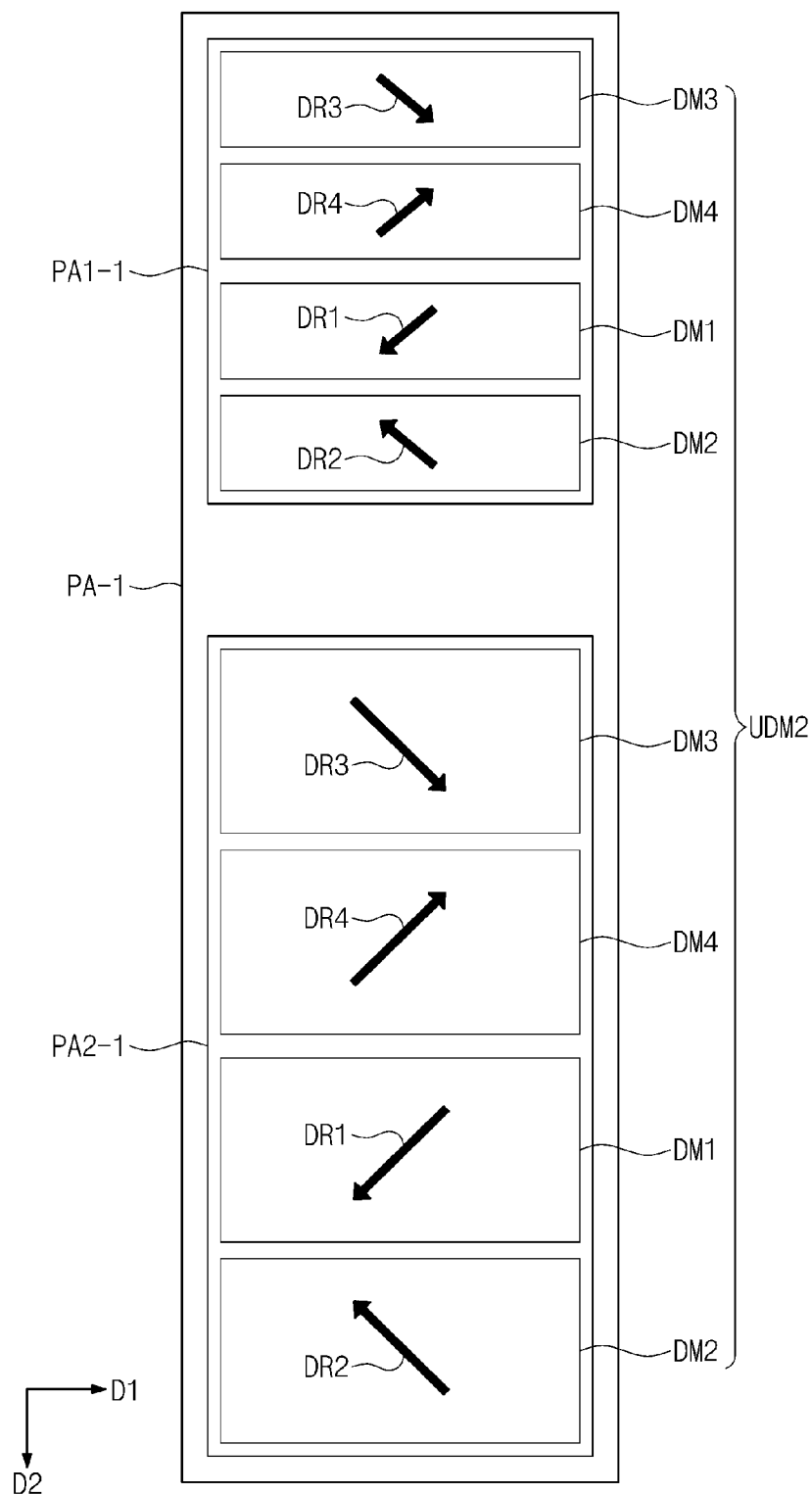
FIG. 3B is a view showing a second unit domain group defined in another pixel area.

FIG. 3A is a diagram showing a first unit domain group defined in the pixel area shown in FIG. 2A, and FIG. 3B is a diagram showing a second unit domain group defined in another pixel area.

Referring to FIGS. 2A and 3A, a first unit domain group UDM1 is defined in the pixel area PA. In the illustrated exemplary embodiment, the first unit domain group UDM1 includes eight domains, and the eight domains are disposed to correspond to the positions of the first to eighth branch portions B1 to B8, respectively. However, the invention is not limited thereto, and the first unit domain group UDM1 may include a different number of domains.

The first unit domain group UDM1 includes first to fourth domains DM1, DM2, DM3, and DM4 defined in the first sub-pixel area PA1 and the other first to fourth domains DM1 to DM4 disposed in the second sub-pixel area PA2. The first to fourth domains DM1 to DM4 are sequentially arranged in the second direction D2 in each of the first and second sub-pixel areas PA1 and PA2.

The first branch portions B1 or the fifth branch portions B5 are disposed in the first domain DM1, and the liquid crystal molecules are aligned in a first alignment direction DR1 in the first domain DM1 by the electric field generated between the first and second substrates 100 and 300 (refer to FIG. 2C). The second branch portions B2 or the sixth branch portions B6 are disposed in the second domain DM2, and the liquid crystal molecules are aligned in a second alignment direction DR2 in the second domain DM2 by the electric field.

In addition, the third branch portions B3 or the seventh branch portions B7 are disposed in the third domain DM3, and the liquid crystal molecules are aligned in a third alignment direction DR3 in the third domain DM3 by the electric field. The fourth branch portions B4 or the eighth branch portions B8 are disposed in the fourth domain DM4, and the liquid crystal molecules are aligned in a fourth alignment direction DR4 in the fourth domain DM4 by the electric field.

Referring to FIGS. 3A and 3B, the second unit domain group UDM2 is defined in the other pixel area PA-1. In the illustrated exemplary embodiment, similar to the first unit domain group UDM1, the second unit domain group UDM2 includes eight domains. However, the invention is not limited thereto, and the second unit domain group UDM2 may include a different number of domains.

More particularly, the pixel area PA-1 includes a first sub-pixel area PA1-1 and a second sub-pixel area PA2-1, and the first to fourth domains DM1 to DM4 are defined in each of the first and second sub-pixel areas PA1-1 and PA2-1. In addition, the domains are sequentially arranged in the second direction D2 in an order of the third domain DM3, the fourth domain DM4, the first domain DM1, and the second domain DM2.

That is, the number of the domains and the types of the domains in the first unit domain group UDM1 are the same as those of the second unit domain group UDM2. However, the arrangement order of the first to fourth domains DM1 to DM4 (e.g., DM1-DM2-DM3-DM4) in the first unit domain group UDM1 is different from the arrangement order of the first to fourth domains DM1 to DM4 (e.g., DM3-DM4-DM1-DM2) in the second unit domain group UDM2. However, the invention is not limited thereto, and the first and second unit domain groups UDM1 and UDM2 may have various other arrangement orders.

The domains are arranged in a matrix configuration in the entire pixel areas of the display panel 500 (refer to FIG. 1A), and in the illustrated exemplary embodiment, the domains are defined by a plurality of the first and second unit domain groups UDM1 and UDM2. Also, since the arrangement order of the first to fourth domains DM1 to DM4 is different in each of the first and second unit domain groups UDM1 and UDM2, at least two domains of the first to fourth domains DM1 to DM4 are repeatedly arranged at an n-th row of the matrix instead of only one domain of the first to fourth domains DM1 to DM4 being arranged at the n-th row of the matrix.

Figure 4:
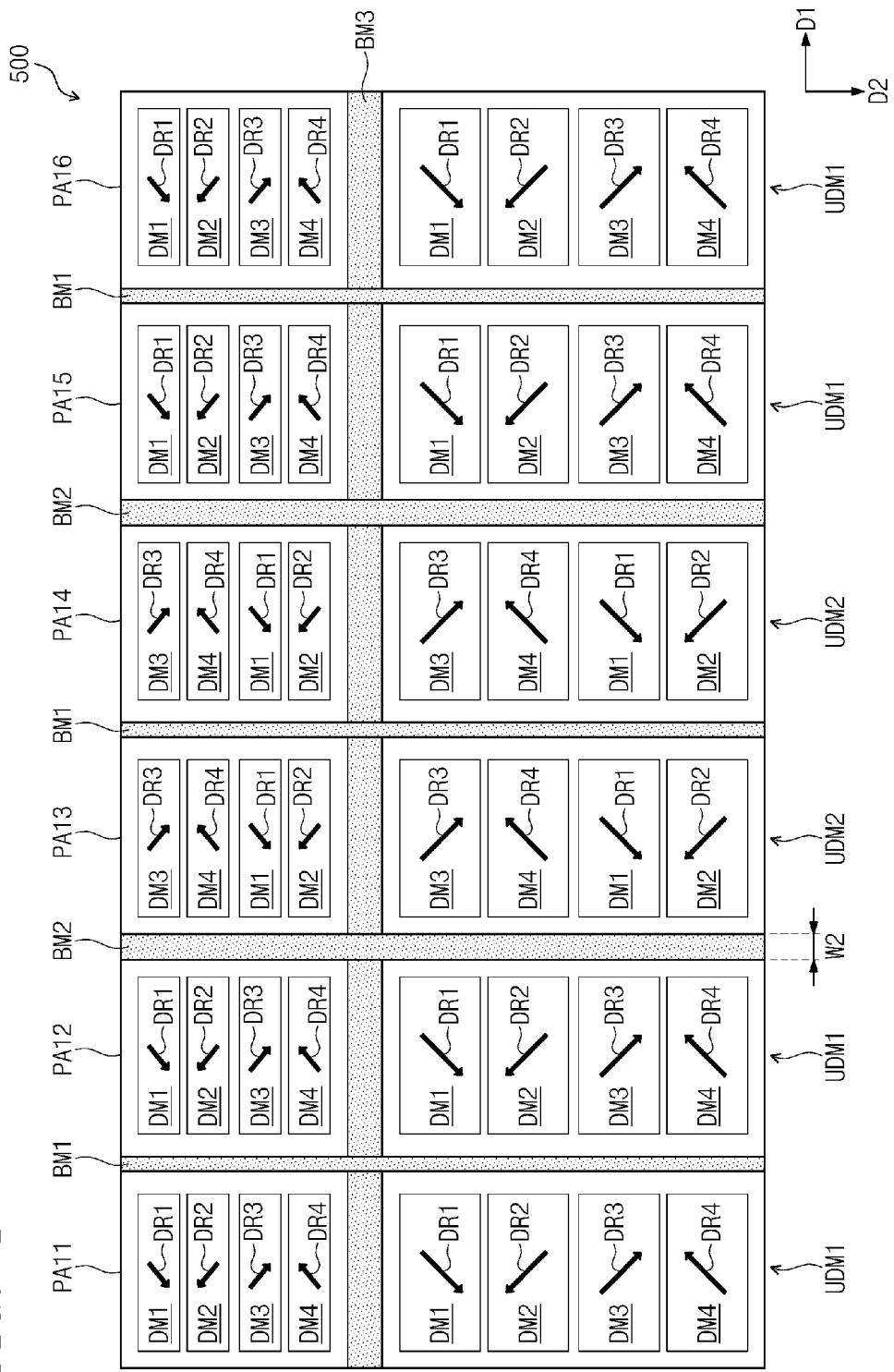
FIG. 4 is a view showing an exemplary embodiment of a plurality of domains, a first light blocking layer, and a second light blocking layer defined in a plurality of pixel areas of the display panel according to the invention.

FIG. 4 is a view showing the domains, the first light blocking layer, and the second light blocking layer defined in the pixel areas of the display panel 500 according to an exemplary embodiment of the invention.

Referring to FIG. 4, first, second, third, fourth, fifth, and sixth pixel areas PA11, PA12, PA13, PA14, PA15, and PA16 are sequentially arranged in the first direction D1. In addition, a plurality of domains is arranged in a matrix configuration in the first to sixth pixel areas PA11 to PA16, a row direction of the matrix is substantially parallel to the first direction D1, and a column direction of the matrix is substantially parallel to the second direction D2.

Similar to the pixel areas PA and PA-1 shown in FIGS. 3A and 3B, each of the first to sixth pixel areas PA11 to PA16 includes a first sub-pixel area and a second sub-pixel area, and first to fourth domains DM1 to DM4 are defined in each of the first and second sub-pixel areas. Thus, in the illustrated exemplary embodiment, the matrix includes the domains arranged in eight rows by six columns.

The first unit domain group UDM1 (refer to FIG. 3A) is defined in each of the first, second, fifth, and sixth pixel areas PA11, PA12, PA15, and PA16, and the second unit domain group UDM2 (refer to FIG. 3B) is defined in each of the third and fourth pixel areas PA13 and PA14. Thus, two first domains DM1, two third domains DM3, and two first domains DM1 are sequentially arranged in a first row of the matrix.

That is, the two first domains DM1 and the two third domains DM3 are alternately and repeatedly arranged with each other in the first row of the matrix instead of only one domain of the first to fourth domains DM1 to DM4 being arranged in the n-th row of the matrix. Thus, a brightness of the n-th row in the matrix is prevented from being varied depending on a viewing angle of a user.

When the domains are arranged in the matrix as described above, the positions of the first light blocking layer BM1 and the second light blocking layer BM2 are determined according to the following rule.

The first light blocking layer BM1 is disposed between two domains, which are sequentially arranged in the n-th row of the matrix and have the same alignment directions. In an exemplary embodiment, the first light blocking layer BM1 is disposed between the first domain DM1 positioned at a first column of the first row and the first domain DM1 positioned at a second column of the first row in the matrix, for example.

The second light blocking layer BM2 is disposed between two domains, which are sequentially arranged in the n-th row of the matrix and have different alignment directions from each other. In an exemplary embodiment, the second light blocking layer BM2 is disposed between the first domain DM1 positioned at the second column of the first row and the third domain DM3 positioned at a third column of the first row of the matrix, for example.

In general, an aperture ratio is reduced as a width of the light blocking layer disposed between two adjacent columns in the matrix including the domains increases. In the illustrated exemplary embodiment, however, it is desirable that the second light blocking layer BM2 having the width greater than that of the first light blocking layer BM1 is disposed in the matrix even though the aperture ratio decreases as the width of the light blocking layer increases. Details on the above feature will be described with reference to FIG. 5.

Figure 5:
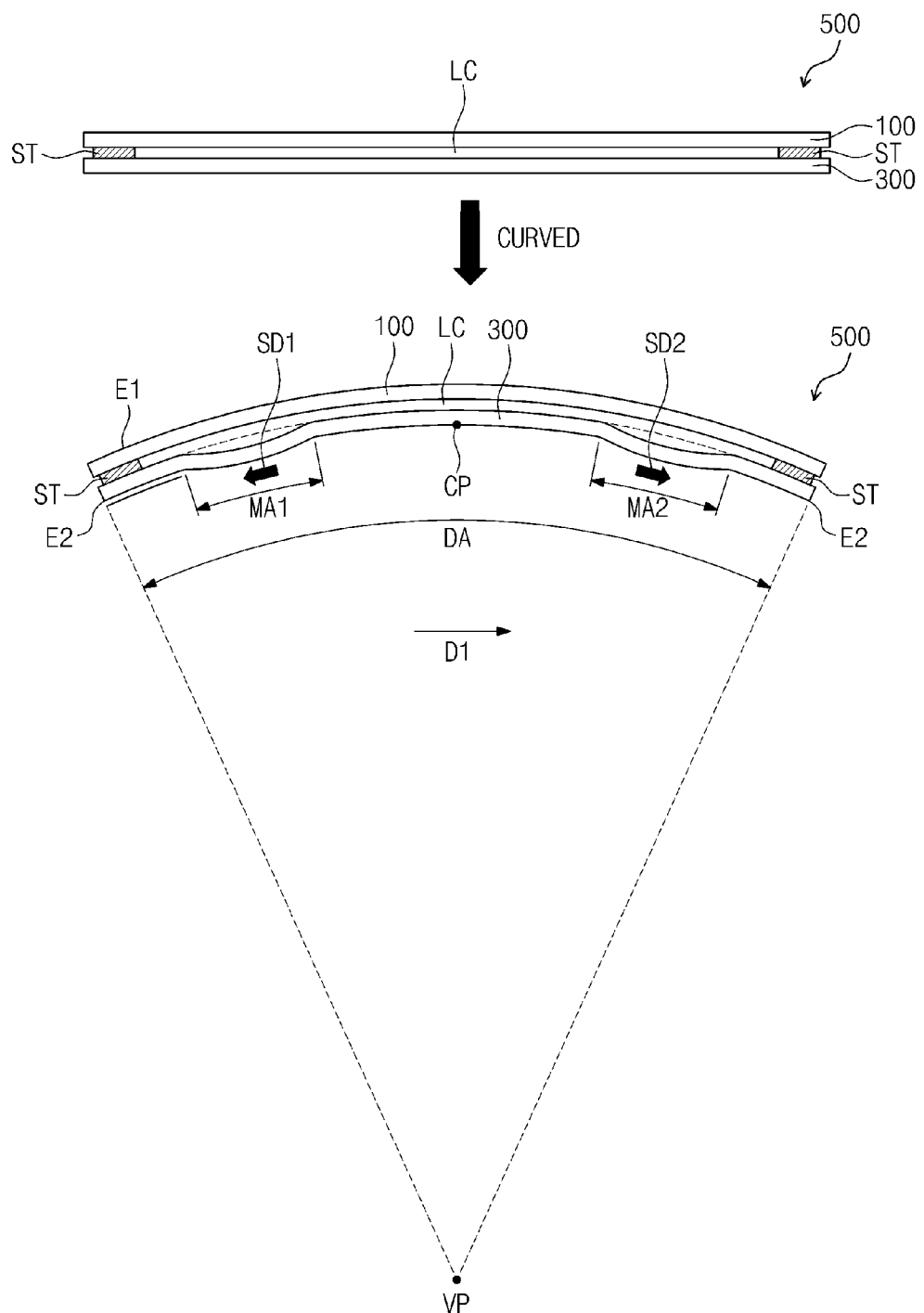
FIG. 5 is a side view showing a process in which the display panel shown in FIG. 1A is curved.

FIG. 5 is a side view showing a process in which the display panel shown in FIG. 1A is curved. FIG. 5 shows a flat state of the display panel and a curved state of the display panel.

Referring to FIG. 5, the display panel 500 includes the first substrate 100, the second substrate 300, the liquid crystal layer LC, and a sealant ST. The sealant ST is provided along an edge of the first substrate 100 or along an edge of the second substrate 300, and the first substrate 100 is coupled to the second substrate 300 while the liquid crystal layer LC is interposed therebetween by the sealant ST.

When the display panel 500 is curved from its original flat state, a lift-off phenomenon occurs on the second substrate 300 curved at a radius of curvature smaller than that of the first substrate 100. Due to the lift-off phenomenon occurring on the second substrate 300, a misalignment may occur between the first substrate 100 and the second substrate 300. That is, the misalignment does not occur when the display panel 500 is in the flat state, but the misalignment occurs when the display panel 500 is in the curved state.

For a detailed description on the misalignment, hereinafter, a shift direction and a misalignment length will be defined as follows. A direction to which the second substrate 300 is shifted with respect to the first substrate 100 due to the misalignment is referred to as the shift direction, and a length by which the second substrate 300 is shifted to the shift direction with respect to the first substrate 100 due to the misalignment is referred to as the misalignment length.

A first side area MA1, a center area CA (refer to FIG. 7), and a second side area MA2 are sequentially defined in the display panel 500 along the first direction D1. The first side area MA1 corresponds to a left area of the display area DA, and the second side area MA2 corresponds to a right area of the display area DA. In addition, the center area CA overlaps a center point CP of the display area DA and disposed between the first side area MA1 and the second side area MA2.

The misalignment may occur at each of the first side area MA1 and the second side area MA2, the shift direction in the first side area MA1 is referred to as a first shift direction SD1, and the shift direction in the second side area MA2 is referred to as a second shift direction SD2.

Referring back to FIG. 4, when the two domains having different alignment directions from each other are sequentially arranged in the n-th row of the matrix, e.g., the second column of the first row and the third column of the first row of the matrix, and the misalignment occurs between the first and second substrates 100 and 300 in the first and second side areas MA1 and MA2, the alignment areas in which the liquid crystal molecules are pre-tilted along different directions from each other by the first and second alignment layers 110 and 310 (refer to FIG. 2C) may overlap each other in the two domains. In this case, the liquid crystal molecules may be abnormally aligned in response to the electric field, and thus, it is desirable to dispose the second light blocking layer BM2 having the width greater than that of the first light blocking layer BM1 between the two domains in order to cover the abnormally-aligned area.

Therefore, it is required to arrange not only the first light blocking layer BM1 but also the second light blocking layer BM2 having the width greater than that of the first light blocking layer BM1 in the matrix even though the aperture ratio of the display panel decreases.

In addition, although the misalignment occurs due to the curved shape of the display panel 500, the defects in alignment caused by the misalignment do not occur in some sections of the n-th row of the matrix since two domains having the same alignment directions are sequentially arranged in the some sections of the n-th row in the matrix, e.g., the first column of the first row and the second column of the first row in the matrix shown in FIG. 4. Thus, the first light blocking layer BM1 may be disposed between the two domains having the same alignment directions instead of the second light blocking layer BM2, and thus the aperture ratio of the display panel 500 is improved.

Figure 6:
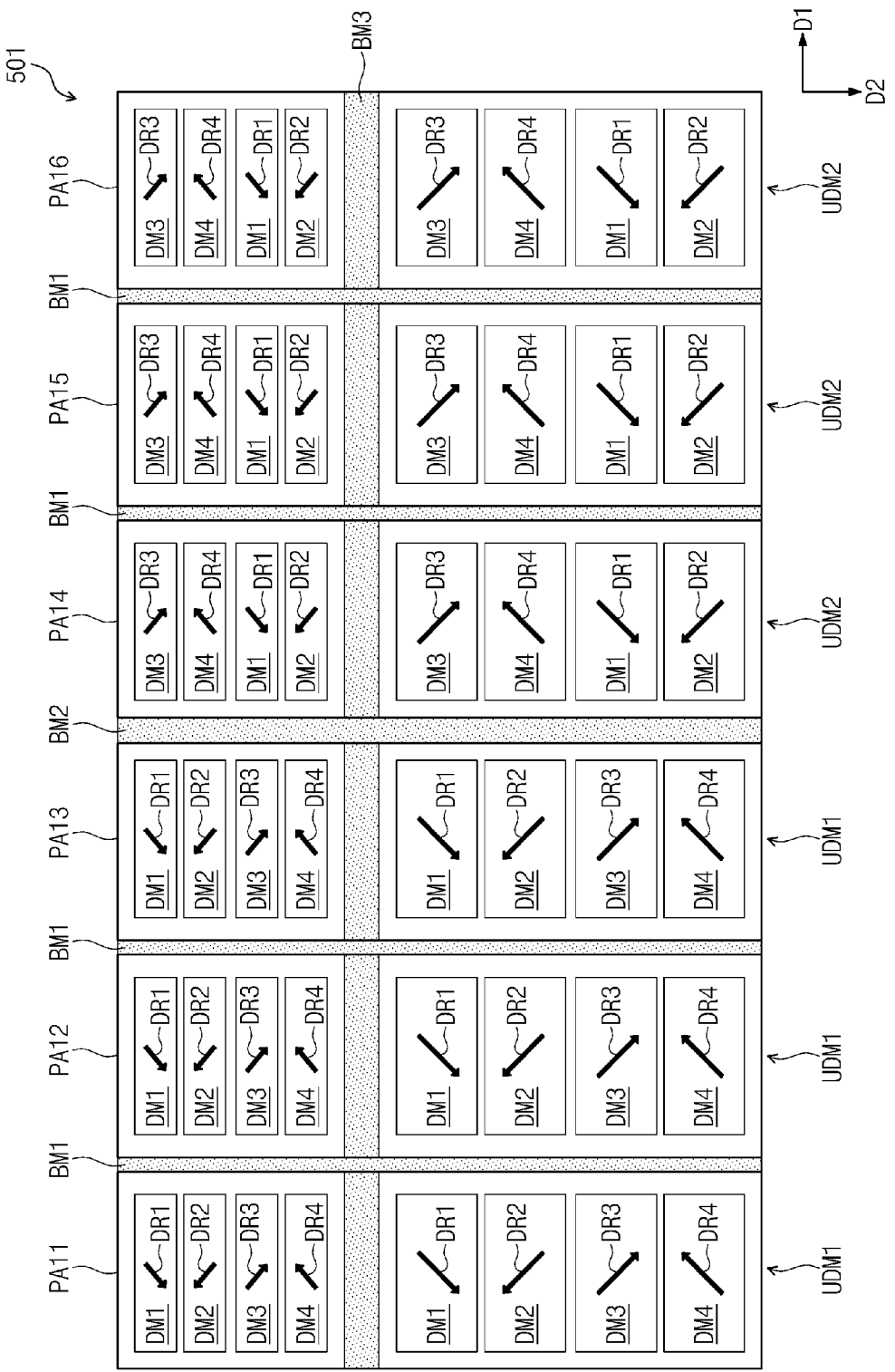
FIG. 6 is a diagram showing another exemplary embodiment of a plurality of domains, a first light blocking layer, and a second light blocking layer defined in a plurality of pixel areas of a display panel according to the invention.

FIG. 6 is a diagram showing a plurality of domains, a first light blocking layer, and a second light blocking layer defined in a plurality of pixel areas of a display panel 501 according to another exemplary embodiment of the invention. In FIG. 6, the same reference numerals denote the same elements in previous exemplary embodiments, and thus the detailed descriptions of the same elements will be omitted.

Referring to FIG. 6, a first unit domain group UDM1 (refer to FIG. 3A) is defined in each of first, second, and third pixel areas PA11, PA12, and PA13 and a second unit domain group UDM2 (refer to FIG. 3B) is defined in each of fourth, fifth, and sixth pixel areas PA14, PA15, and PA16.

Thus, referring to a first row of a matrix shown in FIG. 6, three first domains DM1 and three third domains DM3 are sequentially arranged in a row direction. That is, in the illustrated exemplary embodiment, three first domains DM1 and three third domains DM3 are alternately and repeatedly arranged in the first row of the matrix.

A first light blocking layer BM1 is disposed between two domains sequentially arranged in an n-th row of the matrix and having the same alignment directions. In an exemplary embodiment, the first light blocking layer BM1 is disposed between a first domain DM1 positioned at a first column of the first row and a second column of the first row in the matrix, for example.

A second light blocking layer BM2 is disposed between two domains sequentially arranged in the n-th row of the matrix and having different alignment directions from each other. In an exemplary embodiment, the second light blocking layer BM2 is disposed between a first domain DM1 positioned at a third column of the first row and a third domain DM3 positioned at a fourth column of the first row in the matrix, for example.

In the illustrated exemplary embodiment, the three first domains DM1 and the three third domains DM3 are alternately and repeatedly arranged in the first row of the matrix, but they should not be limited thereto or thereby. According to another exemplary embodiment, m first domains (where m is a natural number equal to or greater than 4) and m third domains DM3 may be alternately and repeatedly arranged in the first row of the matrix.

Figure 7A:
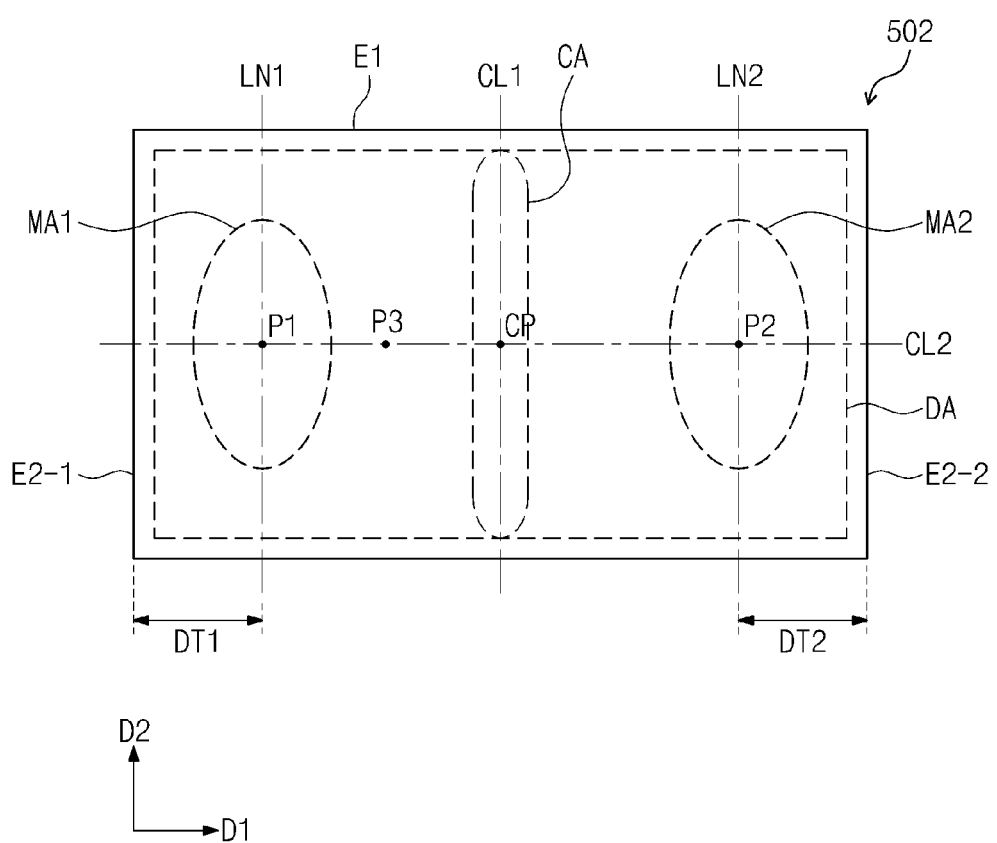
FIG. 7A is a plan view showing another exemplary embodiment of a display panel according to the invention.
Figure 7B:
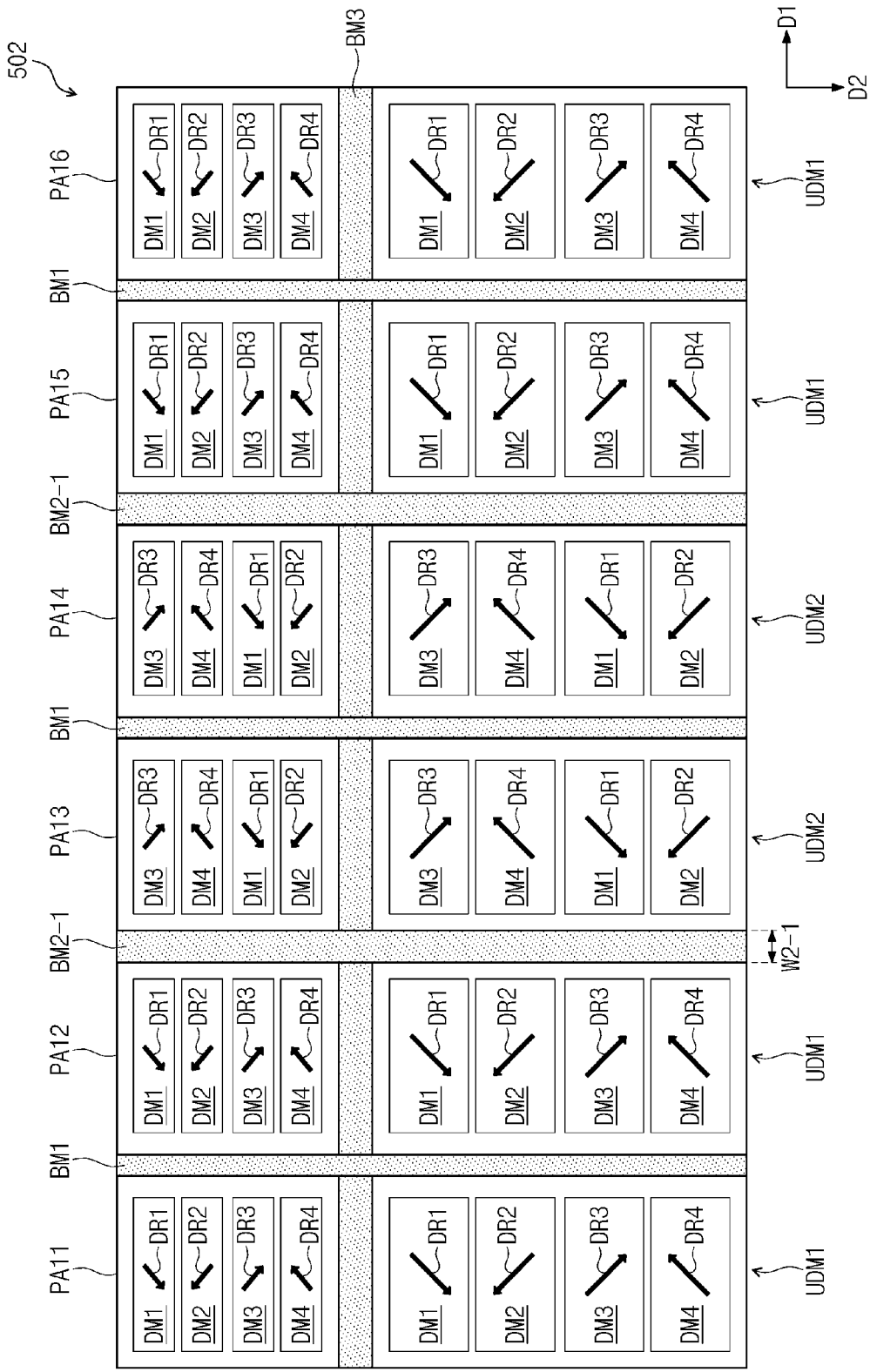
FIG. 7B is a diagram showing a plurality of domains, a first light blocking layer, and a second light blocking layer disposed at a first side area shown in FIG. 7A.

FIG. 7A is a plan view showing a display panel 502 according to another exemplary embodiment of the invention, and FIG. 7B is a diagram showing domains, a first light blocking layer, and a second light blocking layer disposed at a first side area MA1 shown in FIG. 7A.

Referring to FIGS. 7A and 7B, a first side area MA1, a center area CA, and a second side area MA2 are sequentially arranged along the first direction D1 in the display panel 502. As described with reference to FIG. 5, the misalignment may occur at each of the first and second side areas MA1 and MA2 in the display panel 502, and the position of each of the first and second side areas MA1 and MA2 is defined as follow.

When a line passing through a center point CP of the display panel 502 in the second direction D2 is referred to as a center line CL1, the first side area MA1 is disposed between a first short side E2-1 and the center line CL1 and the second side area MA2 is disposed between a second short side E2-2 and the center line CL1.

In addition, when a line spaced apart from the first short side E2-1 by a first distance DT1 and extending in the second direction D2 is referred to as a first line LN1 and a line spaced apart from the second short side E2-2 by a second distance DT2 and extending in the second direction D2 is referred to as a second line LN2, the first line LN1 divides the first side area MA1 into two parts and the second line LN2 divides the second side area MA2 into two parts.

In the illustrated exemplary embodiment, each of the first and second distances DT1 and DT2 may have a length corresponding to about 10 percent (%) to about 25% of the long side E1, for example.

In a case that the display panel 502 is curved along the first direction D1, a stress is mainly attributed to the first and second side areas MA1 and MA2 rather than the center area CA in the display panel 502. Thus, a misalignment length at each of the first and second side areas MA1 and MA2 is greater than a misalignment length at the center area CA, and the misalignment length increases as a distance from the first and second side areas MA1 and MA2 decreases.

A first point P1 is defined in the first side area MA1, a second point P2 is defined in the second side area MA2, and a third point P3 is defined between the center area CA and the first side area MA1.

As described above, since the misalignment length increases as the distance from the first and second side areas MA1 and MA2 decreases, the misalignment length has a maximum value at each of the first and second points P1 and P2, the misalignment length has a minimum value at the center point CP, and the misalignment length has an intermediate value of the minimum value and the maximum value at the third point P3.

As a result, as the misalignment length increases, an area in which the alignment defects occur increases, and thus a width of the light blocking layer covering the area where the alignment defects occur increases.

More particularly, when assuming that the position of the domains in the matrix shown in FIG. 4 corresponds to the third point P3 and the position of the domains in the matrix shown in FIG. 7B corresponds to the first point P1, the second light blocking layer BM2-1 has a second width W2-1 greater than the second width W2 (refer to FIG. 4) of the second light blocking layer BM2 shown in FIG. 4.

Although not shown in figures, since the misalignment length has the minimum value at the center point CP, the width of the second light blocking layer (not shown) corresponding to the center point CP may be smaller than the width of the second light blocking layer corresponding to each of the first, second, and third points P1, P2, and P3.

Therefore, the widths of the second light blocking layer BM2 (refer to FIG. 4) and the second light blocking layer BM2-1 (refer to FIG. 7B) may be adjusted to correspond to the misalignment length changed depending on positions in the display area DA. Accordingly, the width of the second light blocking layer may be reduced to improve the aperture ratio of the display panel 502.

Figure 8:
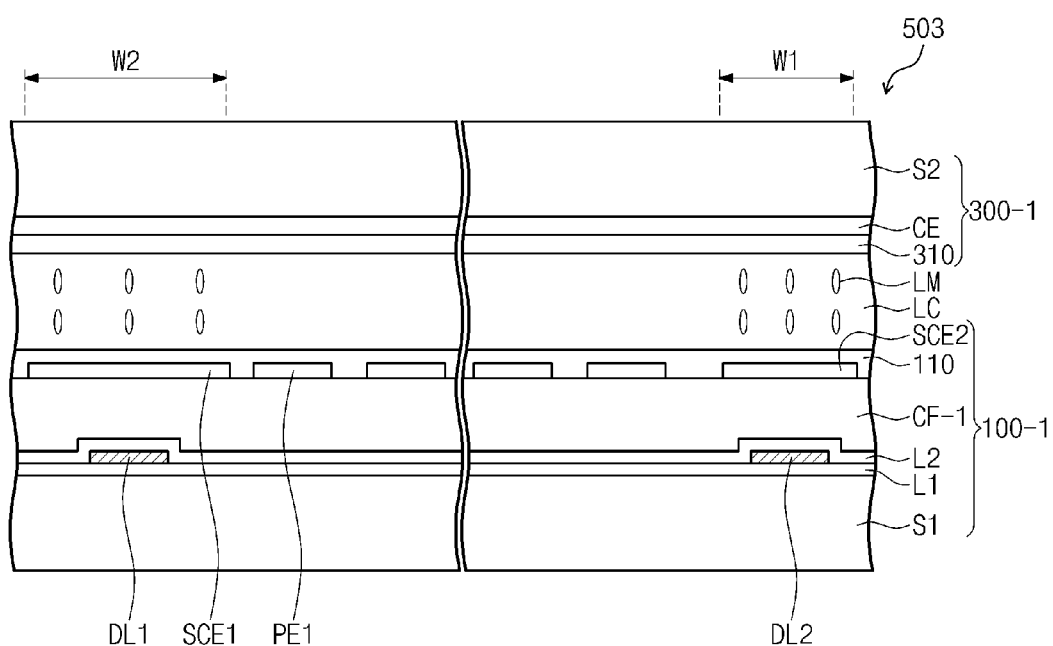
FIG. 8 is a cross-sectional view showing another exemplary embodiment of a display panel according to the invention.

FIG. 8 is a cross-sectional view showing a display panel 503 according to another exemplary embodiment of the invention. In FIG. 8, the same reference numerals denote the same elements in previous exemplary embodiments, and thus the detailed descriptions of the same elements will be omitted.

Referring to FIG. 8, the display panel 503 includes a first substrate 100-1 and a second substrate 300-1. The structure of the display panel 503 will be described below in comparison to the structure of the display panel 500 shown in FIG. 2C.

According to the exemplary embodiment shown in FIG. 2C, the second substrate 300 includes the color filter CF (refer to FIG. 2C), the first light blocking layer BM1 (refer to FIG. 2C), and the second light blocking layer BM2 (refer to FIG. 2C), and according to the exemplary embodiment shown in FIG. 8, the first substrate 100-1 includes a color filter CF-1, a first shielding electrode SCE1, and a second shielding electrode SCE2. In the illustrated exemplary embodiment, the color filter CF-1 is disposed on a first base substrate S1. The color filter CF-1 may be disposed on a second insulating layer L2 and serve as a third insulating layer L3 (refer to FIG. 2C).

In the illustrated exemplary embodiment, the first shielding electrode SCE1 overlaps a first data line DL1 and disposed on the first base substrate S1, and the second shielding electrode SCE2 overlaps a second data line DL2 and disposed on the first base substrate S1. Each of the first and second shielding electrodes SCE1 and SCE2 may extend in the second direction D2 (refer to FIG. 2A) as the first and second light blocking layers BM1 and BM2 (refer to FIG. 2A).

In the illustrated exemplary embodiment, the first and second shielding electrodes SCE1 and SCE2 are disposed on the color filter CF-1 together with a pixel electrode PE, and the first and second shielding electrodes SCE1 and SCE2 include the same material as the pixel electrode PE. In an exemplary embodiment, the first and second shielding electrodes SCE1 and SCE2 may include a transparent conductive material, such as indium tin oxide and indium zinc oxide.

In the illustrated exemplary embodiment, the first and second shielding electrodes SCE1 and SCE2 block the light instead of the first and second light blocking layers BM1 and BM2 shown in FIG. 2C. More particularly, each of the first and second shielding electrodes SCE1 and SCE2 forms an equipotential with the common electrode CE. In an exemplary embodiment, in a case that a voltage of about 5 volts is applied to the common electrode CE, the voltage of about 5 volts is applied to each of the first and second shielding electrodes SCE1 and SCE2, and thus the first and second shielding electrodes SCE1 and SCE2 form the equipotential with the common electrode CE, for example.

When the equipotential is generated between the common electrode CE and each of the first and second shielding electrodes SCE1 and SCE2, the liquid crystal molecules LM disposed between the first and second shielding electrodes SCE1 and SCE2 and the common electrode CE are not affected by any electric field, and thus the liquid crystal molecules LM maintain the alignment state, in which the liquid crystal molecules LM are vertically aligned with respect to the first substrate 100-1. Thus, a phase difference retardation value of the light passing through the liquid crystal molecules LM disposed corresponding to the first and second shielding electrodes SCE1 and SCE2 becomes substantially zero, and the light is absorbed by polarization plates respectively attached to the first and second substrates 100-1 and 300-1 and having absorption axes crossing each other.

As described above, since the first and second shielding electrodes SCE1 and SCE2 have substantially the same function as the first and second light blocking layers BM1 and BM2 (refer to FIG. 2C), the first and second light blocking layers may not be disposed in areas where the first and second shielding electrodes SCE1 and SCE2 are disposed in the illustrated exemplary embodiment.

In addition, the first shielding electrode SCE1 serves as the first light blocking layer BM1 (refer to FIG. 2C), the second shielding electrode SCE2 serves as the second light blocking layer BM2 (refer to FIG. 2C), the first shielding electrode SCE1 has the first width W1 that is the same as the first light blocking layer, and the second shielding electrode SCE2 has the second width W2 that is the same as the second light blocking layer.

FIG. 9 is a diagram showing a plurality of domains, a first light blocking layer, and a second light blocking layer defined in a plurality of pixel areas of a display panel 504 according to another exemplary embodiment. In FIG. 9, the same reference numerals denote the same elements in previous exemplary embodiments, and thus the detailed descriptions of the same elements will be omitted.

Referring to FIG. 9, a first pixel area PA11, a second pixel area PA12, and a third pixel area PA13 are defined in the display panel 504, and the first, second, and third pixel areas PA11, PA12, and PA13 are sequentially arranged along the first direction D1.

In the illustrated exemplary embodiment, a plurality of domains is arranged in a matrix configuration in the first, second, and third pixel areas PA11, PA12, and PA13, a row direction of the matrix is substantially parallel to the first direction D1, and a column direction of the matrix is substantially parallel to the second direction D2.

Each of the first, second, and third pixel areas PA11, PA12, and PA13 includes a first sub-pixel area S-PA1 and a second sub-pixel area S-PA2, and the first and second sub-pixel areas S-PA1 and S-PA2 are arranged in the first direction D1. Therefore, six sub-pixel areas included in the first, second, and third pixel areas PA11, PA12, and PA13 are arranged along the first direction D1.

Similar to the first and second sub-pixel areas shown in FIG. 4, first, second, third, and fourth domains DM1, DM2, DM3, and DM4 are defined in each of the first and second sub-pixel areas S-PA1 and S-PA2. Thus, the domains are arranged in a matrix configuration of four rows by six columns. Also, in the exemplary embodiment shown in FIG. 4, the long side of each pixel area is substantially parallel to the second direction D2, but a long side of each pixel area is substantially parallel to the first direction D1 in the exemplary embodiment shown in FIG. 9.

According to the arrangement of the first to fourth domains DM1 to DM4 in the matrix, two first domains DM1, two third domains DM3, and two first domains DM1 are sequentially arranged in a first row of the matrix along the first direction D1. That is, the two first domains DM1 and the two third domains DM3 are alternately and repeatedly arranged in the first row of the matrix.

In addition, a first light blocking layer BM1 is disposed between two domains sequentially arranged in an n-th row of the matrix and having the same alignment directions. In an exemplary embodiment, the first light blocking layer BM1 is disposed between a first domain DM1 positioned at a first column of a first row in the matrix and a first domain DM1 positioned at a second column of the first row in the matrix, for example.

A second light blocking layer BM2 is disposed between two domains sequentially arranged in the n-th row and having different alignment directions. In an exemplary embodiment, the second light blocking layer BM2 is disposed between the first domain DM1 positioned at the second column of the first row in the matrix and a third domain DM3 positioned at a third column of the first row, for example.

Similar to previous exemplary embodiments, when the positions of the first and second light blocking layers BM1 and BM2 are determined as described above, an area where alignment defects occur due to the misalignment is easily covered by the second light blocking layer BM2 in the display panel 504. In addition, not only the second light blocking layer BM2 is arranged in the matrix but also the first light blocking layer BM1 having a width smaller than the second light blocking layer BM2 is arranged in the matrix. Accordingly, the aperture ratio of the display panel 504 is improved.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A curved display device comprising:
    a first substrate curved along a first direction and comprising a plurality of pixel areas defined therein;
    a second substrate coupled to the first substrate and curved together with the first substrate;
    a liquid crystal layer interposed between the first substrate and the second substrate and comprising liquid crystal molecules; and
    a light blocking member which is disposed on the first substrate or the second substrate and blocks a light,
    wherein a plurality of domains is defined in each of the plurality of pixel areas and arranged in a second direction crossing the first direction,
    the plurality of domains is arranged in a matrix form in the plurality of pixel areas, and
    the light blocking member comprises:
        a first light blocking layer having a first width and disposed between two domains of the plurality of domains sequentially arranged in a row direction of the matrix and aligning the liquid crystal molecules in a same direction; and
        a second light blocking layer having a second width greater than the first width and disposed between two domains of the plurality of domains sequentially arranged in the row direction of the matrix and aligning the liquid crystal molecules in different directions from each other.

2. The curved display device of claim 1, wherein each of the first and second light blocking layers extends between two domains of the plurality of domains arranged in the row direction of the matrix.

3. The curved display device of claim 2, wherein the row direction of the matrix is substantially parallel to the first direction and a column direction of the matrix is substantially parallel to the second direction.

4. The curved display device of claim 1, further comprising:
    a pixel electrode which is disposed on the first substrate and corresponds to each pixel area; and
    a common electrode which is disposed on the second substrate and generates an electric field in cooperation with the pixel electrode,
    wherein the pixel electrode comprises a plurality of branch portions extending in a direction inclined with respect to the first and second directions when viewed in a plan view.

5. The curved display device of claim 4, wherein m first domains and m second domains of the plurality of domains are sequentially arranged in an n-th row of the matrix, where m and n are natural numbers.

6. The curved display device of claim 5, wherein the second light blocking layer is disposed between the m first domains and the m second domains.

7. The curved display device of claim 5, wherein the first light blocking layer is disposed between two adjacent first domains of the m first domains and the first light blocking layer is disposed between two adjacent second domains of the m second domains.

8. The curved display device of claim 4, wherein each of the plurality of pixel areas comprises a first sub-pixel area and a second sub-pixel area, which are arranged in the second direction, and the pixel electrode comprises a first sub-pixel electrode disposed in the first sub-pixel area and a second sub-pixel electrode disposed in the second sub-pixel area.

9. The curved display device of claim 8, wherein the first substrate further comprises:
    a first data line applying a first data signal;
    a first thin film transistor which is electrically connected to the first sub-pixel electrode and the first data line, and switches the first data signal applied to the first sub-pixel electrode;
    a second data line applying a second data signal; and
    a second thin film transistor which is electrically connected to the second sub-pixel electrode and the second data line, and switches the second data signal applied to the second sub-pixel electrode.

10. The curved display device of claim 8, wherein a first domain, a second domain, a third domain, and a fourth domain of the plurality of domains are defined in each of the first and second sub-pixel areas, and alignment directions of the liquid crystal molecules in the first to fourth domains are different from each other.

11. The curved display device of claim 10, wherein each of the first and second sub-pixel electrodes comprises:
    first branch portions of the plurality of branch portions disposed in the first domain and extending in a direction inclined with respect to the first and second directions when viewed in a plan view;
    second branch portions of the plurality of branch portions disposed in the second domain and extending in a direction inclined with respect to the first and second directions when viewed in a plan view;
    third branch portions of the plurality of branch portions disposed in the third domain and extending in a direction inclined with respect to the first and second directions when viewed in a plan view; and
    fourth branch portions of the plurality of branch portions disposed in the fourth domain and extending in a direction inclined with respect to the first and second directions when viewed in a plan view.

12. The curved display device of claim 1, wherein the first substrate and the second substrate comprises a display area curved in the first direction.

13. The curved display device of claim 12, wherein the display area comprises a first side area, a center area, and a second side area sequentially arranged along the first direction, a center point of the display area is disposed in the center area, and a width of the second light blocking layer increases as a distance from the first and second side areas decreases.

14. The curved display device of claim 1, wherein the light blocking layer comprises a light blocking material.

15. The curved display device of claim 1, wherein the light blocking layer comprises a shielding electrode which is disposed on the first substrate and generates an equipotential with the common electrode.

16. The curved display device of claim 1, wherein long sides of each of the pixel areas are substantially parallel to the second direction.

17. The curved display device of claim 1, wherein long sides of each of the pixel areas are substantially parallel to the first direction.

18. A curved display device comprising:
a first substrate curved along a first direction and comprising a plurality of pixel areas defined therein;
a second substrate coupled to the first substrate and curved together with the first substrate;
a liquid crystal layer interposed between the first substrate and the second substrate and comprising liquid crystal molecules; and
a light blocking member which is disposed on the first substrate or the second substrate and blocks a light and disposed between two adjacent pixel areas arranged in the first direction of the plurality of pixel areas,
wherein each of the plurality of pixel areas comprises a unit domain group defined therein,
the unit domain group comprises a plurality of domains arranged in a second direction crossing the first direction,
the plurality of domains is arranged in a matrix form in the plurality of pixel areas, and
the light blocking member comprises:
a first light blocking layer having a first width and extending between two same unit domain groups of the unit domain groups; and
a second light blocking layer having a second width greater than the first width and extending between two different unit domain groups of the unit domain groups.

19. The curved display device of claim 18, wherein the domains defined in the unit domain group align the liquid crystal molecules in different directions from each other.

20. The curved display device of claim 19, wherein the two same unit domain groups are sequentially arranged in a row direction of the matrix such that the first light blocking layer is interposed between the two same unit domain groups, and an arrangement order of the domains in one unit domain group of the two same unit domain groups is the same as an arrangement order of the domains in the other unit domain group of the two same unit domain groups.

21. The curved display device of claim 19, wherein the two unit different domain groups are sequentially arranged in a row direction of the matrix such that the second light blocking layer is interposed between the two different unit domain groups, and an arrangement order of the domains in one unit domain group of the two different unit domain groups is different from an arrangement order of the domains in the other unit domain group of the two different unit domain groups.

22. The curved display device of claim 18, wherein each of the first and second light blocking layers extends between the two unit domain groups arranged in a row direction of the matrix.

23. The curved display device of claim 22, wherein the row direction of the matrix is substantially parallel to the first direction, and a column direction of the matrix is substantially parallel to the second direction.

* * * * *